July 8, 1958 P. M. LUFKIN 2,842,709

RASTER DISTORTION CORRECTION

Filed Oct. 13, 1953 2 Sheets-Sheet 1

INVENTOR.
Paul Marshall Lufkin

BY [signature]

ATTORNEY

RASTER DISTORTION CORRECTION

Filed Oct. 13, 1953

INVENTOR.

Paul Marshall Lufkin

BY

ATTORNEY

United States Patent Office 2,842,709

Patented July 8, 1958

2,842,709

RASTER DISTORTION CORRECTION

Paul M. Lufkin, Mount Ephraim, N. J., assignor to Radio Corporation of America, a corporation of Delaware Application October 13, 1953, Serial No. 385,746

15 Claims. (Cl. 315—24)

This invention relates to television deflection systems and more particularly to circuits for correction of raster distortion in cathode ray tubes.

In present television practice, the image is formed in a cathode ray tube, or kinescope, by an electron beam which is magnetically deflected by the windings of the deflection yoke to trace successive lines of a raster upon a fluorescent screen. The fluorescent screen is deposited on the face plate of the kinescope which is relatively flat. If the electron beam scans at a uniform angular rate, the raster which is thereby traced will be distorted because the flat face plate causes a variance in the length of the electron beam as it scans from the center to the edges of the screen. A uniform rate of angular deflection will result in a non-uniform trace of the beam as it sweeps across the face plate.

This type of raster distortion, known in the art as "pincushioning," tends to be more pronounced in kinescopes with larger flat screen or screens having a radius of curvature greater than the distance between the beam deflection center and the screen center. One method of correcting for pincushion distortion is to carefully design the deflection windings to introduce nonlinear characteristics which will tend to compensate for the nonlinearity of pincushioning. The difficulty experienced with this type of correcting means is that the edges of the image are thrown somewhat out of focus, and a compromise must be made between a good focus and a good raster shape.

It is an object of this invention, therefore, to provide means for correcting pincushion distortion of the raster without impairing the focus of the image.

A further object is to provide means for such a correction which may be adjusted subsequently to the assembling of a television receiver or the like.

A further object is to combine a circuit for correction of raster distortion with a means for controlling the width of the raster.

According to this invention a saturable reactor is used to vary the impedance of the horizontal deflection circuit at the raster repetition frequency. The horizontal deflection is attenuated near the top and bottom of the raster, while the center of the raster remains relatively unaffected. This compensates for the pincushion distortion without affecting the focus of the image. Variation of the direct current applied to the control winding of the saturable reactor provides raster width control.

Other objects of this invention will become apparent upon a reading of the following specification and an inspection of the accompanying drawing in which.

In the various figures of the drawing similar elements are designated by the same numeral.

Figures 1, 3:
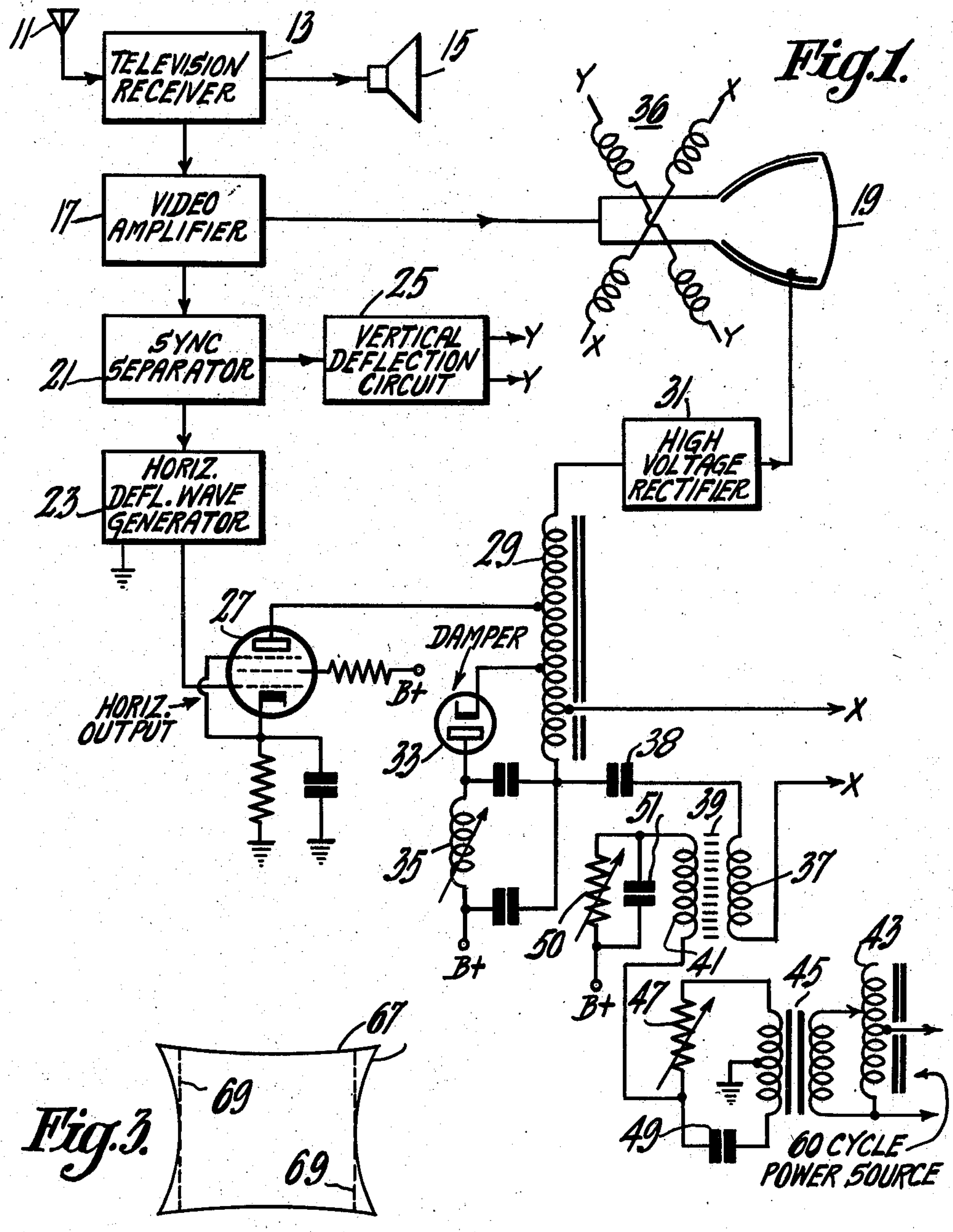
Figure 1 is a circuit diagram, partially schematic, of a cathode ray tube television receiving system including a deflection circuit involving the present invention.
Figure 3 shows the effect of pincushion distortion upon the raster shape and the effective correction which is possible by the use of this invention.

Referring again, but in more detail, to Figure 1 there is shown a circuit arrangement of a television signal receiving and displaying set which includes an antenna 11 and a television receiver 13 which includes the R. F. section, converter section, I. F. amplifier and detector. A sound channel is indicated by the speaker symbol 15. The video amplifier 17 receives a composite signal from which signals are conveyed to the kinescope 19 and the sync separator 21. The sync separator provides a synchronizing signal for both the horizontal deflection wave generator 23 and a vertical deflection circuit 25. The sawtooth deflection waves from the horizontal deflection wave generator are amplified by the horizontal output tube 27 and are applied to the horizontal output transformer 29. The high voltage rectifier 31 receives transient pulses during the retrace intervals and provides the kinescope 19 with its second anode voltage. Oscillations which would result from transient pulses in the output transformer 29 are damped by the damper tube 33. The damper tube is connected to the B+ power source through a linearity control 35.

The horizontal windings of the deflection yoke 36 are coupled to the horizontal output transformer 29 at points X—X with the impedance winding 37 of the saturable reactor 39. The saturation or control winding 41 of the saturable reactor 39 is connected to an alternating current source which includes a variac 43 for varying the amplitude of the wave as it is applied to a power transformer 45. The output of the power transformer is fed to the saturation winding 41 through a phase control which consists of a variable resistor 47 and condenser 49. The alternating current circuit is completed through a bias control which includes a variable resistor 50 and a condenser 51, which are connected to alternating current ground through the B+ of the power supply.

The saturable reactor 39 is essentially of the type described in an article entitled, "Magnetic Amplifiers" by Siegfried R. Hoh published in the May, 1953 issue of Tele-Tech, a periodical of Caldwell-Clement, Inc. The impedance of winding 37 is controlled by the degree of saturation of magnetic core material which depends on the amount of current flow in the control winding 41.

The control winding receives both direct current and 60 cycle alternating current. The direct current may be varied by adjusting the variable resistance 50—this provides a control for raster width since the deflection waves will all be uniformly attenuated by a constant impedance in winding 37 resulting from D. C. in the control winding 41. The alternating current may be varied both in amplitude and in phase—this provides a pincushioning control, since certain deflection waves will be more attenuated than others by the varying impedance resulting in winding 37.

Figure 2:
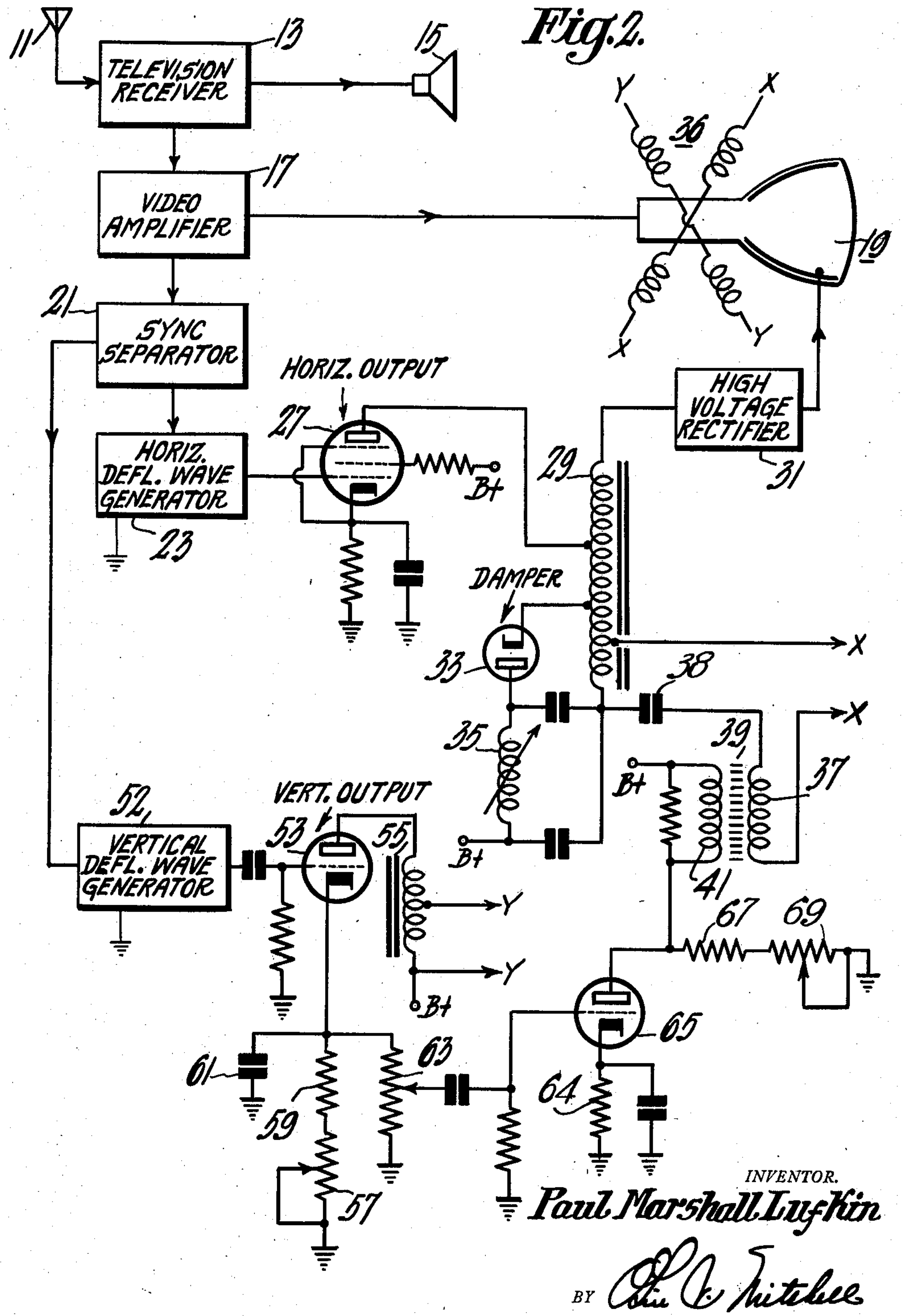
Figure 2 is a circuit diagram, partially schematic, of a second embodiment of this invention in which the correction voltage is obtained from the vertical deflection circuit.

In Figure 2, the circuit is arranged such that the saturable reactor 39 receives its control signal from the vertical deflection circuit. The vertical deflection wave generator 52 supplies sawtooth deflection waves to the vertical output tube 53 and thence to the vertical output transformer 55. The vertical deflection windings of the yoke 36 are connected to the vertical output transformer at connections Y—Y. The cathode of the vertical output tube 53 is connected to ground through a linearity control which comprises a variable resistor 57 in series with a fixed resistor 59 and a shunting capacitor 61. The cusped or parabolic wave which appears at the cathode of the vertical output tube is taken from the potential dividing resistor 63 and supplied to the grid of the triode amplifying tube 65. Resistor 63 must be of considerably greater value than the combination of resistors 57 and 59 in order that the cathode circuit of the vertical output tube 53 will not be unduly loaded. It is therefore usually necessary that the correction wave obtained from the vertical output cathode be amplified by the triode 65. This amplified correction wave is applied directly to the control winding 41 of the saturable reactor 39. Width control in this arrangement is achieved by controlling the direct current flow through the control winding as in the embodiment of Figure 1. This current control is performed by the resistor means comprising the resistor 67 and the variable resistor 69. As in the circuit of Figure 1, the impedance winding 37 of this saturable reactor is included in series with the horizontal deflection winding.

The effect of pincushioning is shown by Figure 3 wherein the heavy outline 67 indicates the shape of a distorted raster. With the use of this invention the horizontal deflection waves may be attentuated at the beginning and at the end of each vertical scanning sweep, while the horizontal deflection waves are permitted to flow without attenuation when the vertical deflection is near its mid-point. This has the effect of compressing the raster horizontally at the top and bottom, while permitting essentially the same horizontal dimension in the center of the raster. The sides of the raster can thus be straightened vertically as indicated by the dashed lines 69. This correction in the shape of the raster does not impair the focus of the electron beam at any point on the raster.

In a system of raster scanning wherein lines or elementary areas of a field are interlaced with other lines or elementary areas of subsequent fields the control voltage for pincushion correction must alternate at the frequency of and must be synchronized with the frequency of scanning successive field. The term "raster repetition rate" as it is used in this specification shall refer to the rate at which the fields of a raster are repeated.

In present television practice a raster is scanned at the rate of 60 fields per second which interlace to yield 30 complete frames per second. The top to bottom repetition rate of raster scanning is 60 cycles per second which is the same frequency commonly used in the Western hemispheres for power distribution and public consumption. If a received television signal is in synchronism with the power source of the receiver, then this invention may be practiced in the form shown by Figure 1. But should the received television signal be at variance with synchronism of the local power source, it will be necessary to use a circuit, such as the one in Figure 2, to insure that the control current for the saturable reactor 39 remains synchronized with the raster repetition frequency.

What is claimed is:

1. An electron beam deflection system for a television receiver, including an impedance element across which a deflection wave of frequency equal to the line frequency is presented and a deflection yoke winding, a circuit for correcting pin-cushion distortion of the raster formed in response to application of the deflection wave across said impedance element to said deflection yoke winding comprising, a saturable reactor having an impedance winding and a control winding, means coupling said impedance winding and said deflection yoke winding in series across said impedance element, means operatively coupled to said control winding for applying direct current potential thereto, a wave generating circuit producing a cusped wave of frequency equal to the field frequency, and means to couple said wave generating circuit to said control winding to apply said cusped wave thereto to vary the deflection system impedance to correct for said pin-cushion distortion.

2. An electron beam deflection system for a television receiver comprising an impedance element across which a deflection wave frequency equal to the line frequency is developed, a deflection yoke winding, a circuit for correcting pin-cushion distortion of the raster formed in response to application of the deflection wave across said impedance element to said deflection yoke winding comprising a saturable reactor having an impedance winding and a control winding, means coupling said impedance winding and said deflection yoke winding in series across said impedance element, means operatively coupled to said control winding for applying a direct current potential thereto, a parabolic wave generating circuit producing a parabolic wave of frequency equal to the field frequency, and means to couple said wave generating circuit to said control winding to apply said parabolic wave thereto to vary the deflection system impedance to correct for said pin-cushion distortion.

3. A deflection circuit arrangement for a television receiving set comprising a deflection yoke winding, a deflection wave generating circuit having a winding across which the deflection wave is developed, means including the impedance winding of a saturable reactor to couple said deflection yoke winding across said deflection wave winding, a control winding for said saturable reactor, a variable resistance element connected to said control winding of said saturable reactor, a parabolic wave generating circuit coupled across said variable resistance element, and means to apply direct operating potential across the series circuit comprising said variable resistance element and said control winding of said saturable reactor.

4. A deflection circuit arrangement for a television receiving set comprising a deflection yoke winding, a deflection wave generating circuit having a winding across which the deflection wave is developed, means including the impedance winding of a saturable reactor to couple said deflection yoke winding across said deflection wave winding, a control winding on said saturable reactor, a cusped wave generating circuit, an amplifying device having an input circuit connected to said cusped wave generating circuit for applying said cusped wave thereto and an output circuit connected to said control winding of said saturable reactor, and adjustable resistance means connecting said control winding of said saturable reactor across a source of direct operating potential to adjust the direct current passing through said control winding.

5. A deflection circuit arrangement for a television receiving set comprising a horizontal deflection yoke winding, a horizontal deflection wave generating circuit having a winding across which the deflection wave is developed, means including an impedance winding of a saturable reactor to couple said horizontal deflection yoke winding across said deflection wave winding, a control winding on said saturable reactor, a vertical deflection wave generating circuit including an electron discharge device having an anode and control and cathode electrodes, a resistance element and a capacitance element in parallel between the cathode electrode and a point of fixed reference potential, means to apply a vertical deflection signal between the control and cathode electrodes thereby to produce a cusped wave across said resistance element, an amplifying device having an input circuit connected to said cathode electrode and an output circuit connected to one terminal of said control winding of said saturable reactor, means connecting the other terminal of said control winding of said saturable reactor to a point of direct operating potential, and an adjustable resistor connected between said one terminal of said control winding and said point of fixed reference potential to adjust the direct current passing through said control winding.

6. A deflection circuit arrangement for a television receiving set comprising a horizontal deflection yoke winding, a horizontal deflection wave generating circuit having a winding across which the deflection wave is developed, a capacitor and the impedance winding of a saturable reactor coupling said horizontal deflection yoke winding across said deflection wave winding, a control winding on said saturable reactor, a vertical deflection wave generating circuit including an amplifier tube having an anode and control and cathode electrodes, means to apply a vertical deflection signal between the control and cathode electrodes, a variable resistance element and a capacitance element in parallel between the cathode electrode and ground, a variably tapped resistor connected between said cathode electrode and ground, a parabolic wave amplifying tube having a cathode, a grid and an anode, a resistance device between the cathode of said parabolic wave amplifying tube and ground, a connection between said grid and the tapping on said variably tapped resistor, and said anode being connected to said control winding of said saturable reactor, means connecting said control winding of said saturable reactor to a point of direct operating potential, and a further adjustable resistor connected between the anode of said parabolic wave amplifying tube and ground to adjust the direct current passing through said control winding.

7. An electron beam deflection system comprising an impedance element across which a deflection wave is developed, a deflection yoke winding, a saturable reactor having an impedance winding and a control winding, means coupling said impedance winding and said deflection yoke winding across said impedance element, means coupling said control winding to a source of alternating current potential, and means coupling a source of direct current potential to said control winding.

8. The structure as recited in claim 7 wherein said means coupling said alternating current potential to said control winding comprises means for connecting said next-to-last named coupling means to a power line, and means are provided for controlling the phase of said alternating current potential applied to said control winding.

9. An electron beam deflection system for a television receiver comprising: an impedance element across which a deflection wave is developed; a deflection yoke winding; a circuit for correcting pin-cushion distortion of the raster formed in response to application of the deflection wave across said impedance element to said deflection yoke winding including said deflection yoke winding and a saturable reactor having a control winding and an impedance winding; means coupling said impedance winding and said deflection yoke winding in series across said impedance element; means for applying a direct current potential across said control winding; means for developing an alternating current potential; means coupling said alternating current developing means to said control winding for applying said alternating current potential thereto to vary the deflection system impedance to correct for said pin-cushion distortion.

10. A deflection control system for a cathode ray beam device comprising: means for producing a plurality of periodically recurring deflection signal waves; means responsive to said deflection signal waves for positioning the beam in said cathode ray beam device; means coupling said source of deflection signal waves to said beam positioning means to produce periodic scanning of said beam in said device; a saturable reactor having an impedance winding and a control winding, said control winding being responsive to an applied potential to vary the impedance of said impedance winding in accordance with the magnitude of said potential; a source of said potential; means coupling said impedance winding to said positioning means in a current controlling relation thereto; and means operatively coupling said potential source to said control winding for applying said potential to said control winding thereby to modify the beam position in said cathode ray beam device in accordance with said potential.

11. A deflection control system for a cathode ray beam device comprising: means for producing horizontal and vertical deflection waves; beam positioning means responsive to said deflection waves for positioning the beam in said cathode ray device; means coupling said deflection wave producing means to said beam positioning means to produce periodic scanning of said beam in said cathode ray device; a saturable reactor having an impedance winding and a control winding, said control winding being responsive to an alternating current potential to vary the impedance of said impedance winding in accordance with an applied alternating current control signal; means coupling said impedance winding to said beam positioning means in such manner that changes in said impedance will produce corresponding changes in the magnitude of one of said deflection waves applied to said beam positioning means; means for developing an alternating current control signal having a predetermined waveform; and means operatively coupling said control signal developing means to said control winding for applying said control signal to said control winding thereby to modify the beam position in said cathode ray device in accordance with said control signal.

12. The subject matter as recited in claim 11 in which said alternating current control signal has a predetermined periodically recurring waveform of the same frequency as said vertical deflection waves thereby to provide dynamic control of said beam deflection.

13. Dynamic raster distortion compensation apparatus for electron beam deflection systems comprising: a cathode ray display device having a light-producing target and means forming and directing an electron beam toward said target; means for deflecting said electron beam in two dimensions to scan a raster on said target at a predetermined repetition rate, the geometrical configuration of said target being such as to produce distortion of the shape of said raster; variable impedance means responsive to a control signal coupled to said deflecting means for modifying said beam deflection in a manner complementary to said shape distortion of said raster; means for producing an alternating current control signal having a predetermined repetition rate equal to said raster repetition rate; means coupling said control signal producing means to said control signal responsive means for applying said control signal thereto, whereby said beam deflection is modified in said complementary manner thereby to compensate for said raster shape distortion.

14. Dynamic deflection control apparatus for electron beam deflection systems comprising: a cathode ray display device having a target and means forming and directing an electron beam directed toward said target; electron beam deflecting means coupled to said display device for deflecting said beam in two dimensions; a saturable reactor having an impedance winding and a control winding, said control winding being responsive to a control signal applied thereto to control the magnitude of impedance of said impedance winding in accordance with the magnitude of said control signal; means coupling said impedance winding to said electron beam deflecting means in a current-controlling relation thereby to control the magnitude of deflection of said electron beam in one of said dimensions in accordance with said control signal; means for producing said control signal, said control signal including a direct current potential for controlling the static magnitude of said deflection in said last named dimension and an alternating current potential having a predetermined waveform occurring in synchronism with the deflection in said other dimension thereby to dynamically modify the deflection in said one dimension, and means coupling said control signal producing means to said control winding.

15. Dynamic deflection control apparatus for electron beam deflection systems comprising: a cathode ray display device having a target and means forming and directing an electron beam toward said target; horizontal and vertical beam deflecting means coupled to said display device for deflecting said electron beam in horizontal and vertical directions to scan a raster on said target, said deflecting means including means for producing horizontal and vertical deflection potentials having predetermined periodically recurring repetition rates and means applying said deflection potentials to said beam deflecting means; a saturable reactor having a control winding and an impedance winding, said control winding being responsive to a control signal applied thereto to control the magnitude of impedance of said impedance winding in accordance with the magnitude of said control signal; means coupling said impedance winding to said horizontal deflecting means in a current-controlling relation thereby to control the horizontal deflection of said electron beam in accordance with said control signal;

means for producing said control signal, said control signal including a direct curent component for controlling the width of said raster and an alternating current component having a predetermined periodically recurring waveform of the same repetition rate as said vertical deflection potential thereby to dynamically modify said raster width at said vertical deflection scanning rate, and means for coupling said control signal producing means to said control winding.

References Cited in the file of this patent

UNITED STATES PATENTS

| | | |
|---|---|---|
| 2,534,557 | Ostreicher | Dec. 19, 1950 |
| 2,586,395 | Taylor | Feb. 19, 1952 |
| 2,646,531 | Giacoletto | July 21, 1953 |